United States Patent [19]
Christensen

[11] Patent Number: 5,894,968
[45] Date of Patent: Apr. 20, 1999

[54] VEHICLE CLOTHES HANGER

[76] Inventor: Bruce W. Christensen, 127 Carlton Heights, North Bend, Oreg. 97459

[21] Appl. No.: 08/989,497

[22] Filed: Dec. 12, 1997

[51] Int. Cl.[6] .............................. A47G 25/14; B60R 7/00
[52] U.S. Cl. .......................... 223/1; 224/313; 294/142
[58] Field of Search ..................... 223/85, 92, DIG. 3, 223/DIG. 4; D6/315; 224/313, 309; 294/137, 142; 211/113

[56] References Cited

U.S. PATENT DOCUMENTS

| D. 184,375 | 2/1959 | Schaefer | 223/85 |
|---|---|---|---|
| 1,410,930 | 3/1922 | Launder | 223/85 |
| 2,080,467 | 5/1937 | Feldman et al. | 223/85 |
| 4,466,652 | 8/1984 | Townsend | 294/142 |
| 4,474,316 | 10/1984 | Philibert | 223/88 |
| 4,824,156 | 4/1989 | Greene | 294/142 |
| 4,856,688 | 8/1989 | Ackmann | 224/217 |
| 5,328,068 | 7/1994 | Shannon | 224/42.46 |
| 5,330,244 | 7/1994 | Rodwell | 294/143 |
| 5,373,979 | 12/1994 | Moore | 223/DIG. 4 |
| 5,398,984 | 3/1995 | Elder | 294/142 |
| 5,405,067 | 4/1995 | Huges | 224/42.45 A |
| 5,441,323 | 8/1995 | Goddard | 297/158 |
| 5,524,948 | 6/1996 | Bostwick | 294/142 |
| 5,558,383 | 9/1996 | Lancellotti | 294/143 |
| 5,598,956 | 2/1997 | Schenberg | 223/1 |
| 5,697,661 | 12/1997 | Robinson, Sr. et al. | 294/142 |
| 5,836,486 | 11/1998 | Ohsugi | 223/85 |

*Primary Examiner*—Bibhu Mohanty
*Attorney, Agent, or Firm*—Chernoff, Vilhauer, McClung & Stenzel, LLP

[57] ABSTRACT

A garment hanger for supporting hangers includes a securement member defining an arch shaped portion that is rotatably engageable with a garment hook of a vehicle. A transverse member is rigidly attached to the securement member and defines a first end portion and a second end portion at respective ends. A first end portion of a substantially straight first angled member rigidly interconnects to the first end portion of the transverse member forming a first acute angle therebetween. A first end portion of a substantially straight second angled member rigidly interconnects to the second end portion of the transverse member forming a second acute angle therebetween. A second end portion of the substantially straight first angled member and a second end portion of the second angled member are rigidly interconnected together forming an oblique angle therebetween. A major portion of the substantially straight first angled member and a major portion of the substantially straight second angled member together define a first plane therethrough. A major portion of the arch shaped portion defines a second plane therethrough. The first plane and the second plane are oriented substantially perpendicular with respect to one another.

1 Claim, 1 Drawing Sheet

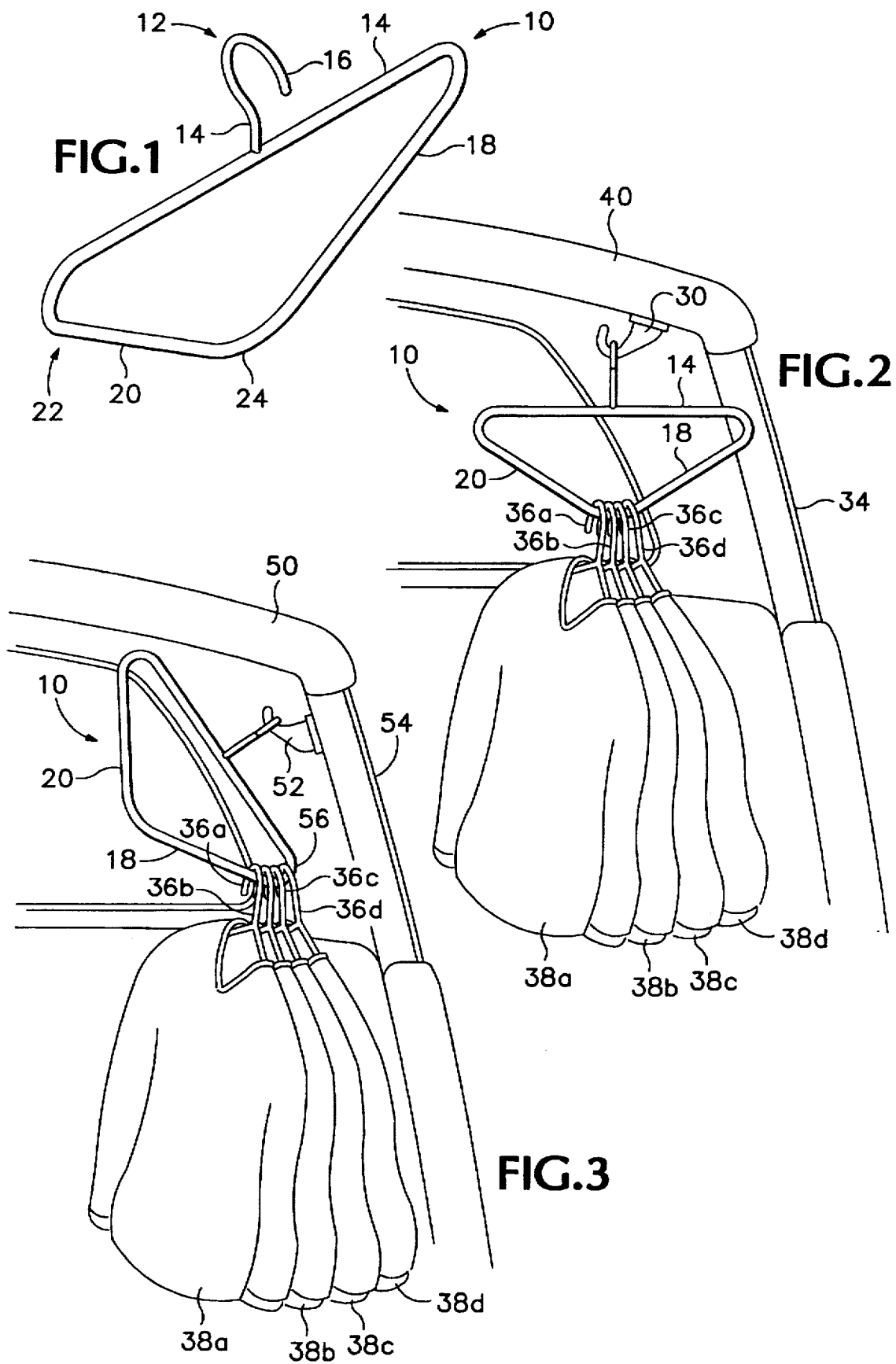

VEHICLE CLOTHES HANGER

The present invention relates to a garment hanger suitable for use within a vehicle, and in particular to a garment hanger suspendable from an existing clothing garment hook within a vehicle and suitable for hanging multiple traditional clothes hangers.

Many vehicles are equipped with conventional small clothing garment hooks located on the ceiling above either the rear side windows or the rear portion of the vehicle. Unfortunately, such small clothing garment hooks are incapable of supporting more than a limited number of hangers therefrom. In addition, traditional hangers attached to the garment hook hang in an orientation that is parallel to the side window, so that all the clothes supported by each garment hook are closely stacked upon one another. This configuration makes it difficult to remove one hanger without removing the other hangers and associated garments. This configuration also tends to cause the closely packed garments to wrinkle.

Devices are known that can be attached to existing garment hooks to increase their hanging capacity. One common garment hanging device is an elongate bar which is supported at its opposite ends on existing garment hooks on opposing sides of the vehicle and extends from side-to-side across the rear portion of the vehicle. However, this type of garment hanging device is expensive, obstructs the driver's view through the rear window, and prevents the use of the back seat by passengers.

Shannon, U.S. Pat. No. 5,328,068, discloses an automobile clothes hanger bracket for mounting to a grab handle in the interior of a vehicle to increase its garment carrying capacity. The bracket has a rack with an arcuate lower portion and a generally straight top portion extending between the upper ends of the arcuate portion forming an open reclining D-shaped configuration. Two opposed hook members attach to the grab handle and a plurality of spaced hanger-receiving elements receive a plurality of clothes hangers thereon. The hanger bracket taught by Shannon is complex, expensive, requires a grab handle in the interior of the vehicle, and has moving parts susceptible to failure. Moreover, the hanger bracket taught by Shannon is susceptible to impacting the rear window if the hook members become loosened.

Elder, U.S. Pat. No. 5,398,984, discloses a garment hanger that supports a plurality of clothes hangers in a vehicle. The garment hanger has a frame member from which the clothes hangers are hung and a support member that attaches to the garment hook. The frame member and support member are connected together by a non-rigid coupling mechanism that allows the frame member to move relative to the support member. The angular relations of different portions of the frame member are limited so that traditional clothes hangers do not move onto the leg portions of the frame member resulting in the garment hanger becoming disengaged from the garment hook. In addition, Elder teaches the use of a groove structure on the frame member to help prevent the movement of clothes hangers on the garment hanger. Elder further teaches that the non-rigid connection is desirable so as to allow the frame member to move with respect to the support member to reduce stress to the support member and the garment hook.

What is desired, therefore, is a garment hanger suitable for use in a vehicle that is inexpensive, supports many clothes hangers, does not significantly obstruct the drivers view through the rear window nor prevent use of the rear seat, has no moving parts susceptible to failure, and maintains the clothes hangers in their intended position.

SUMMARY OF THE INVENTION

The present invention overcomes the aforementioned drawbacks of the prior art by providing a garment hanger for supporting hangers that includes a securement member defining an arch shaped portion that is rotatably engageable with a garment hook of a vehicle. A transverse member is rigidly attached to the securement member and defines a first end portion and a second end portion at respective ends. A first end portion of a substantially straight first angled member rigidly interconnects to the first end portion of the transverse member forming a first acute angle therebetween. A first end portion of a substantially straight second angled member rigidly interconnects to the second end portion of the transverse member forming a second acute angle therebetween. A second end portion of the substantially straight first angled member and a second end portion of the second angled member are rigidly interconnected together forming an oblique angle therebetween. A major portion of the substantially straight first angled member and a major portion of the substantially straight second angled member together define a first plane therethrough. A major portion of the arch shaped portion defines a second plane therethrough. The first plane and the second plane are oriented substantially perpendicular with respect to one another.

The garment hanger is a one piece device that is inexpensive to construct and is durable because it includes no moving parts. Moreover, by maintaining the clothes near the side window, the driver's view out the rear window is not substantially obscured while maintaining organization of the clothes. In addition, the sizing and ability of the garment hanger to rotate permits its use in both a horizontal orientation and an inclined orientation with the clothes hangers in an appropriate location for each.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a pictorial view of an exemplary embodiment of a garment hanger of the present invention.

FIG. 2 is a pictorial view of the rear portion of a first vehicle including a garment hanger of FIG. 1 and a garment hook.

FIG. 3 is a pictorial view of the rear portion of a second vehicle including a garment hanger of FIG. 1 and a garment hook.

DETAILED DESCRIPTION OF THE PREFERRED EMBODIMENT

Referring to FIG. 1, an automobile garment hanger 10 of the present invention includes an securement member 12. The securement member 12 preferably includes a vertical portion 14 and an arched shaped portion 16. Alternatively, other suitable securement members 12 may be used, such as, for example, a ring shaped member. The garment hanger 10 also includes a body 22 that includes a substantially straight transverse member 14 together with two leg portions 18 and 20. The transverse member 14 is preferably rigidly attached to which the securement member 12 so that the vertical portion 14 is preferably at a substantially 90 degree angle thereto. The pair of substantially straight leg portions 18 and 20 are rigidly attached to the transverse member 14 forming respective acute angles α and β therebetween. The leg portions 18 and 20 are rigidly interconnected forming an oblique angle therebetween of preferably 140° at a lower connection region 24.

A major portion of each of the leg portions 18 and 20 together define a body plane therethrough. Preferably, the leg portions 18, 20 and the transverse member 14 are all planar. A major portion of the arch shaped portion 16 defines a securement plane therethrough. Preferably, the securement member 12 is planar. The body plane and the securement plane are oriented substantially perpendicular with respect to one another.

The garment hanger 10 may be constructed of any suitable material such as metal, wood, fabric, glass, and/or plastic. The garment hanger 10 is preferably constructed of the same material throughout. Typically the garment hanger 10 is constructed of plastic because it is a relatively inexpensive material and because it may be easily formed. When plastic material is used, the entire garment hanger 10 may be formed by an extrusion, a mold, or a stamp process. The cross-sectional shape of the garment hanger 10 is not limited to any particular shape. A circular cross-sectional shape is preferred having a diameter in the range of ⅛ inch to ½ inch, however, the diameter will depend on the material used and the load to be supported. Generally, the cross-sectional shape of the garment hanger 10 is uniform throughout. The garment hanger 10 should be constructed such that it may support a load of at least 150 pounds.

Referring to FIGS. 2 and 3, the garment hanger 10 is sized such that it is suitable for hanging from a vehicle garment hook 30 and 52 within a vehicle 40 and 50, respectively. The location of the garment hook 30, 52 within the vehicle 40, 50 is typically above the rear side window 34, 54, respectively.

Specifically referring to FIG. 2, the particular vehicle 40 may have the garment hook 30 above the rear side window 34. The garment hook 30 is horizontally spaced away from the rear window 34 a sufficient distance such that the garment hanger 10 can hang with the transverse member 14 at a horizontal orientation. With a substantially 90 degree orientation between the securement member 12 and the transverse member 14, the body 22 of the garment hanger 10 will be oriented generally perpendicular to the substantially adjacent window 34 of the vehicle 40. Clothing hangers 36a–36d are supported by the garment hanger 10 and will tend to locate themselves at the connection region 24 because of the oblique angle θ between the leg portions 18 and 20 of the garment hanger 10. As movement of the vehicle 40 tends to cause the garment hanger 10 to sway from side to side, the clothing hangers 36a–36d supporting clothes 38a–38d thereon, respectively, will tend to maintain a central alignment. One reason that this central alignment is maintained is because the clothes hangers 36a–36d are supported in the connection region 24 directly beneath the securement member 12. Also, because the garment hook 30 is generally located in alignment with the back seat of the vehicle 40, the clothes 38a–38d tend to hang freely thus minimizing wrinkling.

Specifically referring to FIG. 3, the particular vehicle 50 may have the garment hook 52 to the side of the rear window 54. The garment hook 52 is horizontally spaced away from the rear window 54 an insufficient distance such that the garment hanger 10 must hang with the transverse member 14 at an inclined orientation. With the substantially 90 degree orientation between the securement member 12 and the transverse member 14, the body 22 of the garment hanger 10 will be pivoted at an angular relation with respect to the substantially adjacent window 54 of the vehicle 50. Clothing hangers 36a–36d are supported by the garment hanger 10 and will tend to locate themselves at the lower region 56 between the leg portion 18 and the transverse member 14 because of the tilted orientation. More specifically, the lower region 56 will be substantially directly below the garment hook 52. In addition, the region where the clothes hanger 36a–36d are supported has an acute angle β between the transverse member 14 and the leg portion 18 which helps maintain their central location. As movement of the vehicle 40 tends to cause the garment hanger 10 to sway from side to side the clothing hangers 36a–36d supporting clothes 38a–38d, respectively, will tend to maintain its tilted alignment. As the lower region 56 of the body 22 tends to move toward and away from the window 54, the weight of the clothing 38a–38d will tend to counteract the motion thereby maintaining its alignment thus preventing the body 22 from striking the window 54. Also, the garment hook 30 is generally located in alignment with the back seat of the vehicle 50 resulting in the clothes 38a–38d tending to hang freely thus minimizing wrinkling. In an alternative embodiment, the hangers 36a–36d may hang at the region between the leg portion 20 and the transverse member 14.

The garment hanger 10 is designed so that it can be secured to a typical garment hook, however, the securement member 12 can be designed so that it can also engage other shaped and sized garment hooks.

A rigid connection between the garment hanger 10 and the garment hook 30, 52 would result in transferring large forces to the garment hook 30, 52 during sudden speed changes of the vehicle 40, 50. This is especially true when the weight of the clothes 38a–38d supported by the garment hook 30, 52 is large. Such large forces on the garment hook 30, 52 may result in the garment hook 30, 52 shearing from the vehicle 40, 50. The rotational engagement of the garment hanger 10 by the arched securement member 12 significantly reduces the forces applied to the garment hook 30, 52 during sudden speed changes of the vehicle 40, 50. This significantly reduces the potential likelihood of shearing off the garment hook 30, 52.

The garment hanger 10 is a one piece device that is inexpensive to construct and is durable because it includes no moving parts. Moreover, by maintaining the clothes near the side window, the driver's view out the rear window is not substantially obscured while maintaining organization of the clothes. In addition, the sizing and ability of the garment hanger 10 to rotate permits its use in both a horizontal orientation (FIG. 2) and an inclined orientation (FIG. 3) with the clothes hangers in an appropriate location for each.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A garment hanger for supporting hangers comprising:

(a) a securement member defining an arch shaped portion that is rotatably engageable with a garment hook of a vehicle;

(b) a transverse member rigidly attached to said securement member, said transverse member defining a first end portion and a second end portion at respective ends of said transverse member;

(c) a first end portion of a substantially straight first angled member rigidly interconnected to said first end portion of said transverse member forming a first acute angle therebetween, a first end portion of a substantially straight second angled member rigidly interconnected to said second end portion of said transverse member forming a second acute angle therebetween;

(d) a second end portion of said substantially straight first angled member and a second end portion of said second angled member rigidly interconnected together forming an oblique angle therebetween; and (e) a major portion of said substantially straight first angled member and a major portion of said substantially straight second angled member together defining a first plane therethrough, a major portion of said arch shaped portion defining a second plane therethrough, said first plane and said second plane oriented substantially perpendicular with respect to one another.

* * * * *